United States Patent [19]
Dancasiu

[11] Patent Number: 5,692,797
[45] Date of Patent: Dec. 2, 1997

[54] IMPACT BRACKET

[75] Inventor: Michael Dancasiu, Wuppertal, Germany

[73] Assignee: Schade KG, Plettenberg, Germany

[21] Appl. No.: 451,168

[22] Filed: May 26, 1995

[30] Foreign Application Priority Data

May 30, 1994 [DE] Germany ............... 44 18 805.6
Jul. 20, 1994 [DE] Germany ............... 44 25 572.1

[51] Int. Cl.⁶ .................................................... B60J 5/04
[52] U.S. Cl. ............................................ 296/188; 296/146.6
[58] Field of Search ........................ 296/146.6, 188; 49/502; 52/731, 232

[56] References Cited

U.S. PATENT DOCUMENTS

| | | | |
|---|---|---|---|
| 4,708,390 | 11/1987 | Palentyn et al. | 296/146.6 X |
| 4,901,500 | 2/1990 | Wycech | 296/146.6 X |
| 4,978,562 | 12/1990 | Wycech | 296/146.6 X |
| 5,056,861 | 10/1991 | Garnweidner et al. | 296/146.6 X |

FOREIGN PATENT DOCUMENTS

| | | | |
|---|---|---|---|
| 479401 | 4/1992 | European Pat. Off. | 296/146.6 |
| 1405875 | 10/1969 | Germany . | |
| 4026459 | 2/1992 | Germany | 296/146.6 |
| 4031680 | 4/1992 | Germany | 296/146.6 |
| 9218388 | 10/1992 | Germany . | |
| 9215014 | 11/1992 | Germany . | |
| 9215425 | 11/1992 | Germany . | |
| 404095526 | 3/1992 | Japan | 296/146.6 |
| 1392710 | 4/1975 | United Kingdom . | |

*Primary Examiner*—Joseph D. Pape
*Attorney, Agent, or Firm*—Michael J. Striker

[57] ABSTRACT

An impact bracket for a side wall of a vehicle or the like has at least one trough-shaped profiled rail which is open along its length and has a central region and end regions. The profiled rail in the central region when compared with the end region forms a reinforcing part which increases a resistance moment against bending, the reinforcing part having an increased cross-section in the central region.

30 Claims, 15 Drawing Sheets

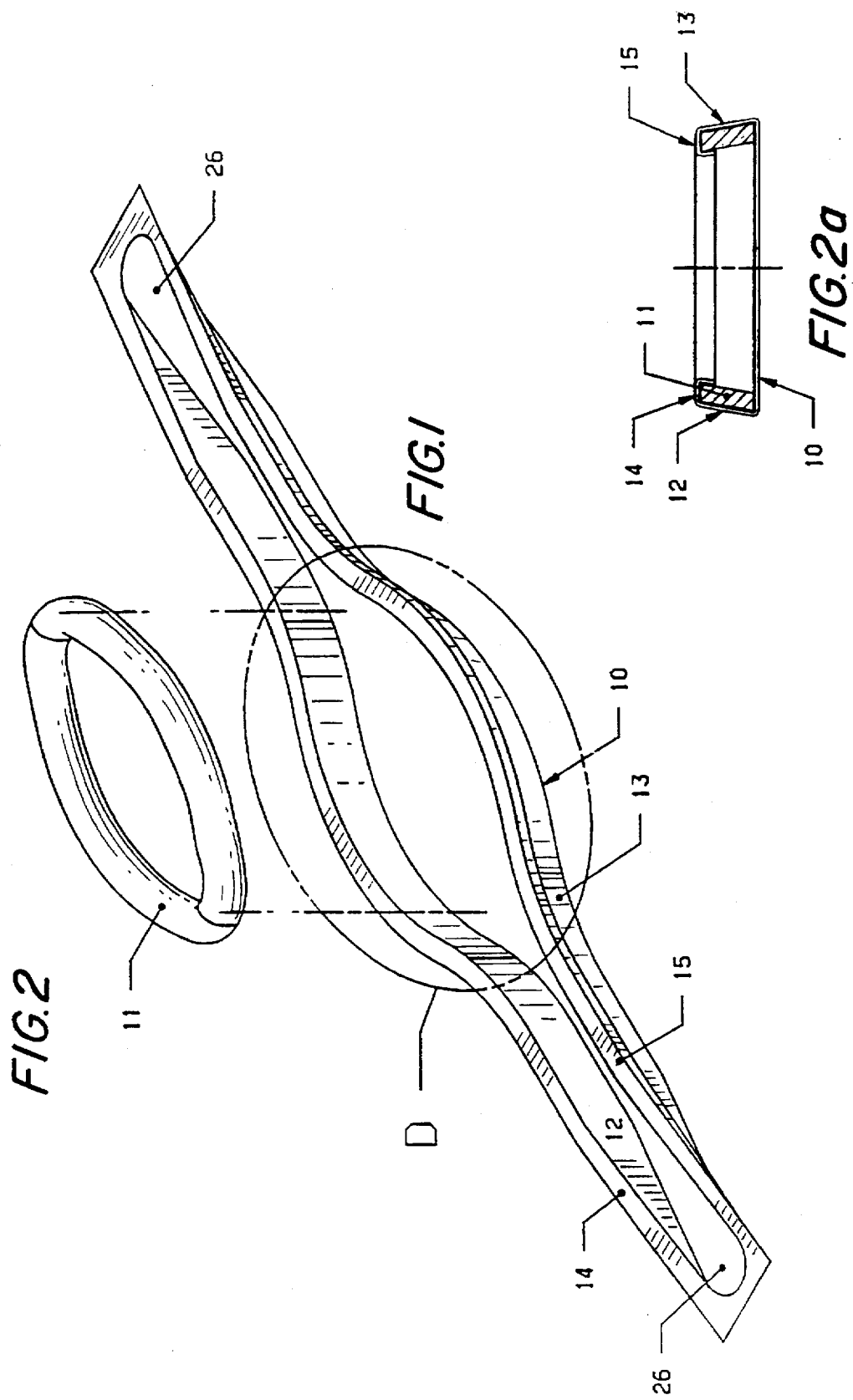

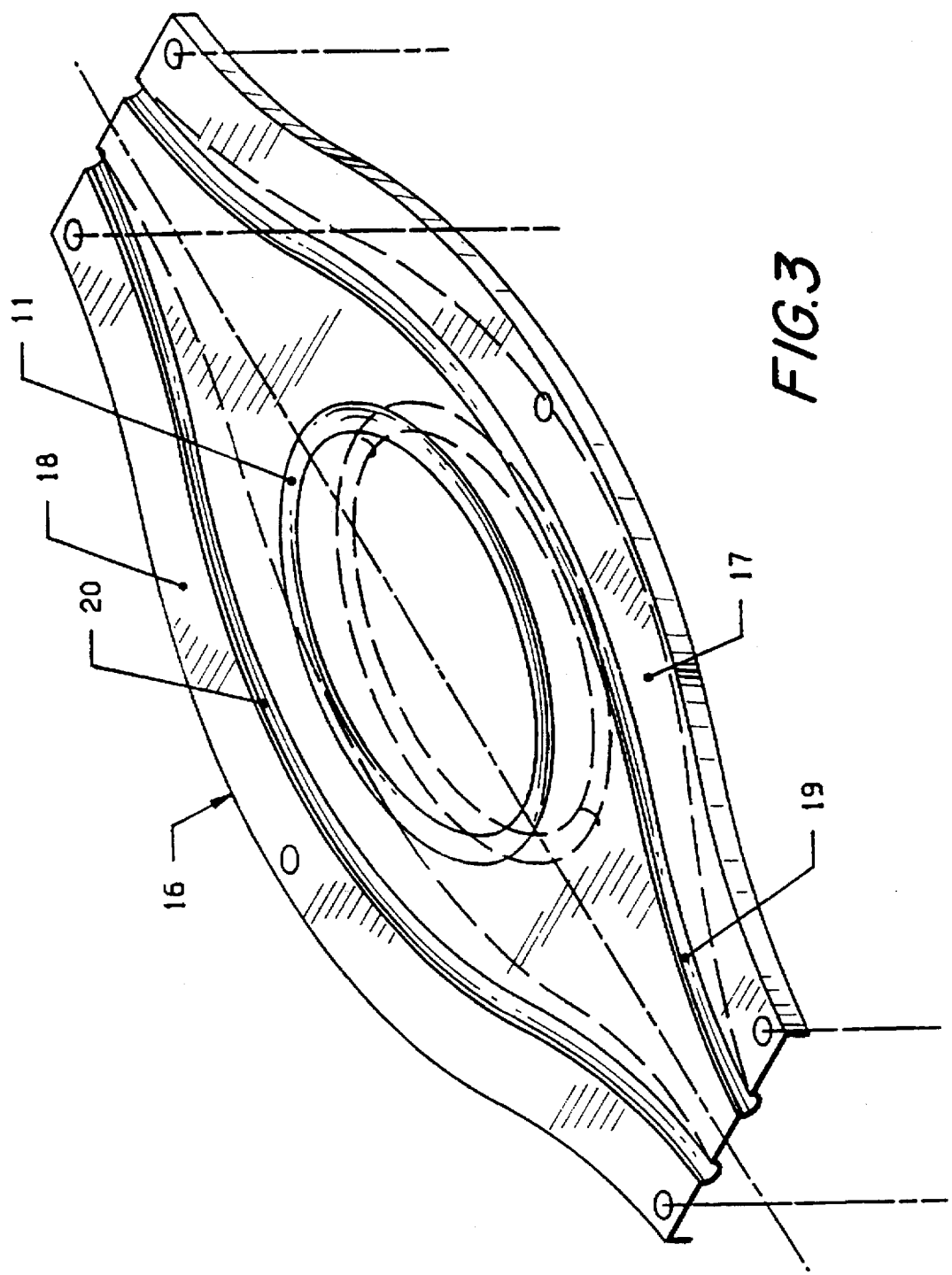

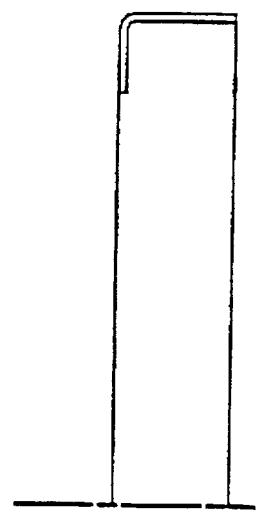
FIG.6
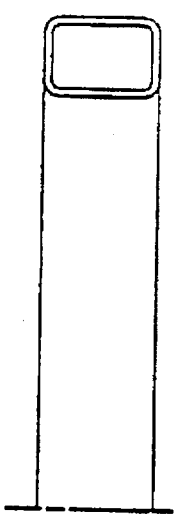
FIG.7
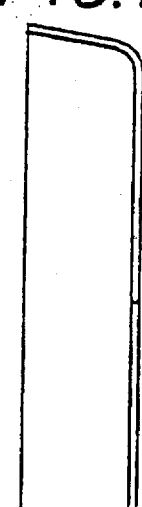
FIG.8
FIG.9
FIG.10
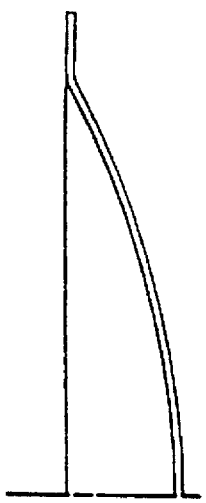
FIG.11
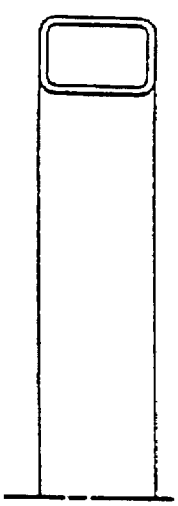
FIG.12
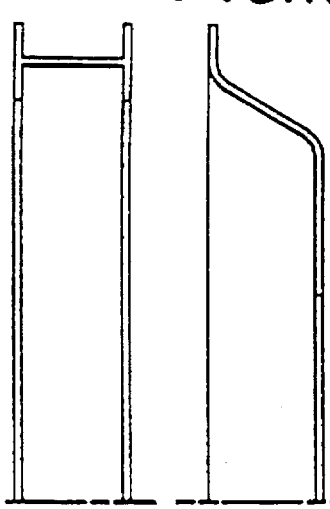
FIG.13
FIG.14
FIG.15

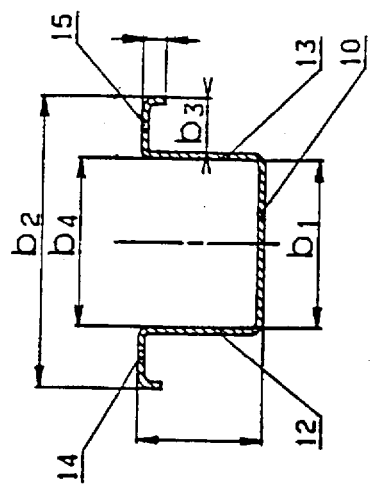
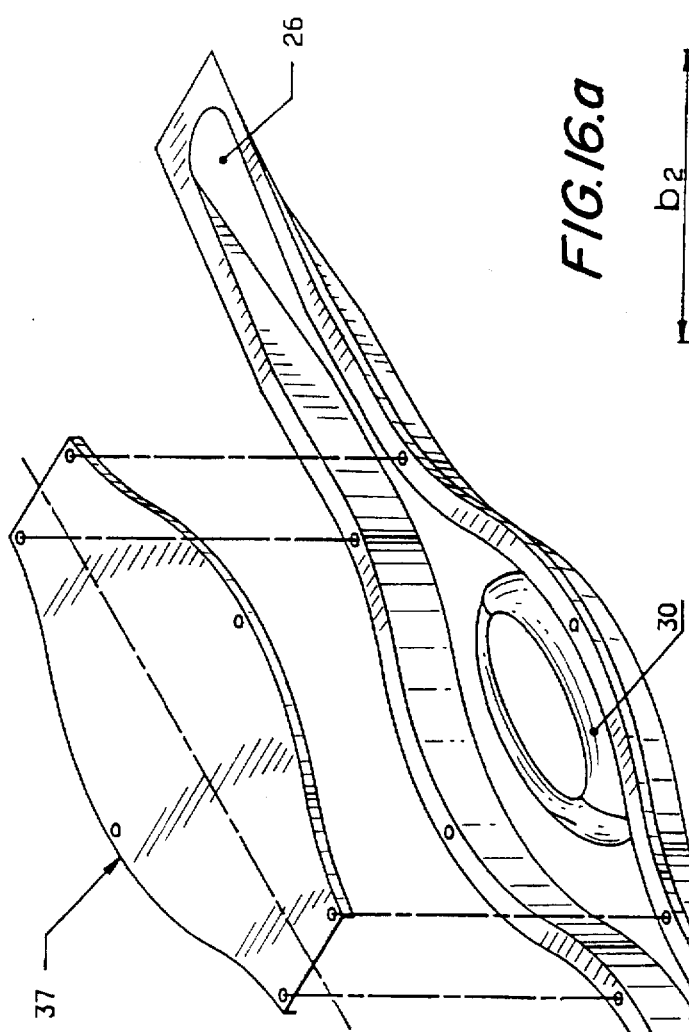
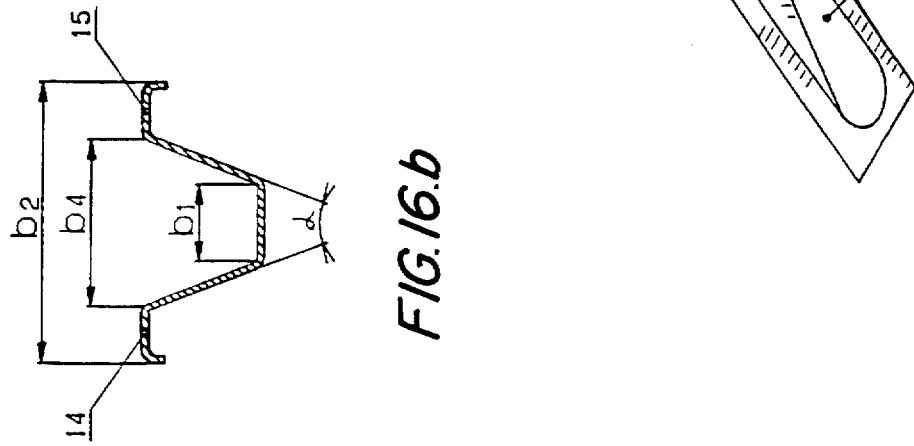

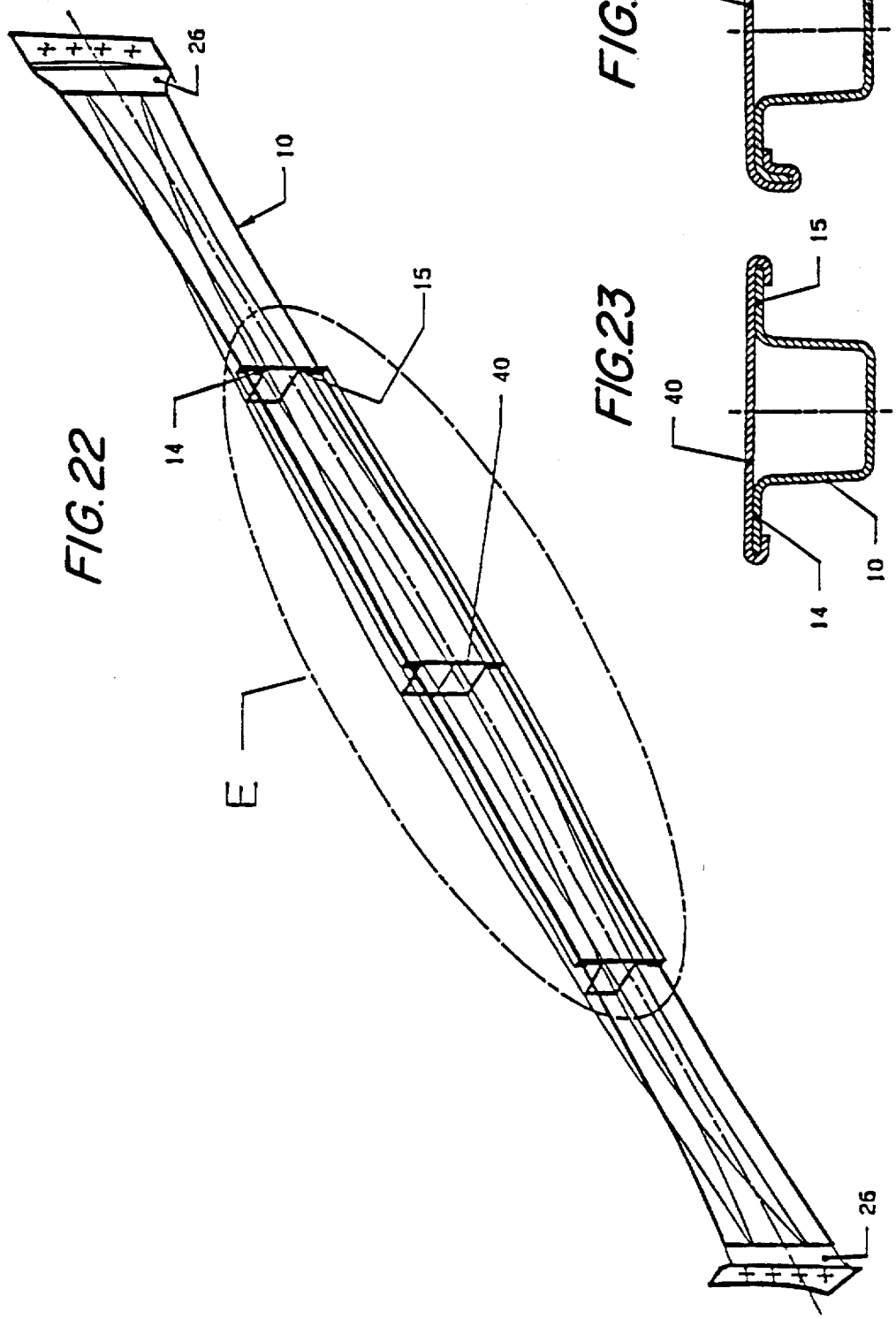

1

IMPACT BRACKET

BACKGROUND OF THE INVENTION

The present invention relates to an impact bracket side parts of vehicles or the like, for example for automobile doors.

Impact brackets of the above mentioned type are usually integrated in side parts of a body or automobile doors, in order to improve protection of the passenger occupants during a lateral impact. The impact brackets which are formed as profiled rails must be designed so as to provide a maximum resistance moment against bending. During an accident the impact brackets react substantially greater to bending than to pulling. Since the impact brackets are fixed mainly with the ends on the body or the door, the distribution of forces and stresses acting during an accident from outside are to be evaluated as a bracket onto supports. Therefore the bending stress in the central region of the length of the bracket is substantially greater than in both end regions. An ideal form for the bracket is such a form with which the bending stress is distributed uniformly or approximately uniformly over the whole length.

Impact brackets in form of profiled rails have different cross-sections. However, in all impact brackets the common feature is that the cross-section of the profiled rails does not change over their length, with the exception of the end regions which are used for mounting of the impact bracket on the body walls.

SUMMARY OF THE INVENTION

Accordingly, it is an object of the present invention to provide an impact bracket of the above mentioned type, which avoids the disadvantages of the prior art.

More particularly, it is an object of the present invention to provide an impact bracket of the above mentioned type which, in order to increase the protection of the occupants of a vehicle during loading has an ideal shape for bending, and the relationship of the bending stresses to one another at least in the central region of the bracket is minimal when compared with the end regions.

In keeping with these objects and with others which will become apparent hereinafter, one feature of the present invention resides, briefly stated, in an impact bracket which is composed of at least one trough-shaped profiled rail open at one end, the profiled rails in the central region forms a reinforcing part which increases a resistance moment against bending, and the reinforcing part is formed selectively by a cross-section increase of the profiled rail in the center region relative to the end regions, and/or by an additional reinforcing element.

It is important in accordance with the present invention that the profiled rail in the center region has a reinforcing part which increases the resistance moment against bending. The reinforcing part in accordance with the present invention can be formed for example by different cross-sectional dimensions over its length and/or width, and/or height from the ends of the profiled rail to the center. The different dimensions as understood hereinbelow are the wall thicknesses of the profiled rail and the reinforcing element. This cross-sectional dimensions can increase in the sense of a cross-section reinforcement. This can be provided either practically on a single main bracket. It is also however possible to obtain the cross-section reinforcement by placing of the additional reinforcing element on the profiled rail.

In accordance with a further embodiment of the present invention, the profiled rail and the reinforcing element can be preferably composed of materials with different strength. The selection of different materials can be desirable when in practice the profiled rail is loaded by pulling stresses, while the reinforcing elements are mainly subjected to pressure stresses. Also, similarly to the profiled rails, the length, the width and the height of the reinforcing element can be reinforced.

In accordance with another possibility to increase the resistance moment of the impact bracket, as considered in the cross-section the width of the lower transverse web of the profiled rail can increase from its ends toward the center, the height of the outer angled portion of both lateral legs and the width of the angled portions reduce toward the center respectively, and in the thusly formed central region of the profiled rail the additional reinforcing element can be placed and mounted. In accordance with this proposal the profiled rail is partially weakened, since the reinforcing part is maintained locally very small, while due to the additional reinforcing element these weak points are not compensated but completed in the sense of the cross-section reinforcement.

The profiled rail preferably has a U-shaped cross-section, and the outer edges of the side angles of the profiled rails are angled outwardly for forming upper edge webs one time or many times. It is to be understood that the angled portions can be also angled inwardly depending on the desired mounting type. Preferably, the edge webs are bent outwardly substantially perpendicularly. Instead of selecting a U-shaped profile, it is also possible to adjust the side legs of the open profile rail, as considered in the cross-section at an angle α which is changeable along the length of the profiled rail.

An especial reinforcing action in accordance with a further proposal of the invention is obtained when the width of the lower transverse web of the profiled rail and the distance of the side legs in their upper region is changeable from the end regions of the profiled rail length to the center independent from one another.

In accordance with a further important proposal, the distance between the side legs can be selectively increased or reduced over the length or a partial length of the profiled rail. These reinforcement contours can continuously run toward or run out toward the cross-section center or lower transverse web of the profiled rails. Preferably the width of the lower transverse web increases or reduces over the length or the partial length of the profiled rail toward the center. In this way an especially efficient reinforcement of the profiled rail is obtained, since due to the increase or reduction of the cross-sectional distances between the side legs, practically a wave-shaped or another continuous material reinforcement is provided.

It is also advantageous when in the region of the bottom of the reinforcement part one or several reinforcement islands in form of material reinforcements are provided, which can be integrated in the material of the bracket or can be separately placed. Thereby in the region of the reinforcement part, a further improving reinforcement or an increase of the resistance moment is obtained. Preferably, the separately placed reinforcing islands are mechanically mounted on the bottom of the reinforcing part, or welded, or glued. For saving the material, the islands can be provided also with recesses.

If the impact bracket is provided with an additional reinforcing element formed as a ring or the like in the central region of the profiled rail, the stability of the impact bracket is additionally substantially increased so that with the same force application from outside the bracket is subjected to a smaller deformation and thereby the protection of the occupants is substantially increased. The profiled rails can be composed of light metal, for example aluminum, for maintaining the low weight, while the reinforcing element can be composed for example of steel. It is to be understood that it is also possible to produce the profiled rails, for example of steel and the reinforcement element from spring steel. Preferably, the reinforcing element is formed as a ring inserted in the profiled rail and formed with an angular, C-shaped, U-shaped, double-T-shaped or hollow cross-section, for example in form of a segment-like portion or a full portion.

Preferably, the reinforcing element is formed as a replacement part and is provided with outer legs which at least partially overlap the edge webs of the profiled rail. The edge webs and the outer legs are connected with one another by mechanical connecting means, and/or welding or glueing. For increasing the stiffness of the replacement part, it is preferably provided with corrugations or the like which follow the outer contour. It is ideal when in accordance with a further proposal of the invention, the walls of the replacement part correspond to the reinforcement contour course of the bracket, or in other words, the profiled rail.

The profiled rail can have a C-shaped cross-section. The free angled edges of the inserted ring are thereby engaged.

Alternatively, the replacement part can be formed as a double-T-profiled piece, and the parallel flange can be unequal. Thereby a connection with the angled edge legs of the profiled rail can be provided, so that the short flange engages in the profiled rail. In a loading case, a force flux is provided in which the small bending-stable parallel legs of the profiled rail are unloaded. The force is then introduced from the central web of the T-shaped replacement in the transition region between the base of the U-shaped profiled rail and both parallel flanges. It is however also possible to maintain the widths of these parallel flanges constant. It is to be understood that it is also possible for further reinforcement of the lower cross-section of the profiled rail to punch it with bulges or other contour changes of the cross-section of the profiled rail.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a central region of a profiled rail which is increased in cross-section in accordance with the present invention;

FIG. 2 is a view showing a reinforcement element formed as a ring and inserted in the central expanded region of the profiled rail of FIG. 1;

FIG. 2a is a view showing mounting of the ring of FIG. 2 on a C-shaped profiled rail with inwardly bent edges;

FIG. 3 is a view showing a reinforcement element formed as a replacement part and insertable in the central region of the profiled rail of FIG. 1;

FIGS. 6–15 are views showing various cross-sections for different replacement parts;

FIG. 16 is a view which is similar tot eh view of FIG. 5 but showing a reinforcement island arranged on the body of the profiled rail in the reinforcement part;

FIGS. 16a and 16b are views showing two further possible cross-sectional shapes for the profiled rail;

FIG. 22 is a view showing a further embodiment of the impact bracket in an inclined view;

FIGS. 23 and 24 are views showing two possible types of connection between the replacement part and the profiled rail of FIG. 22.

DESCRIPTION OF THE PREFERRED EMBODIMENTS

Figure 4:
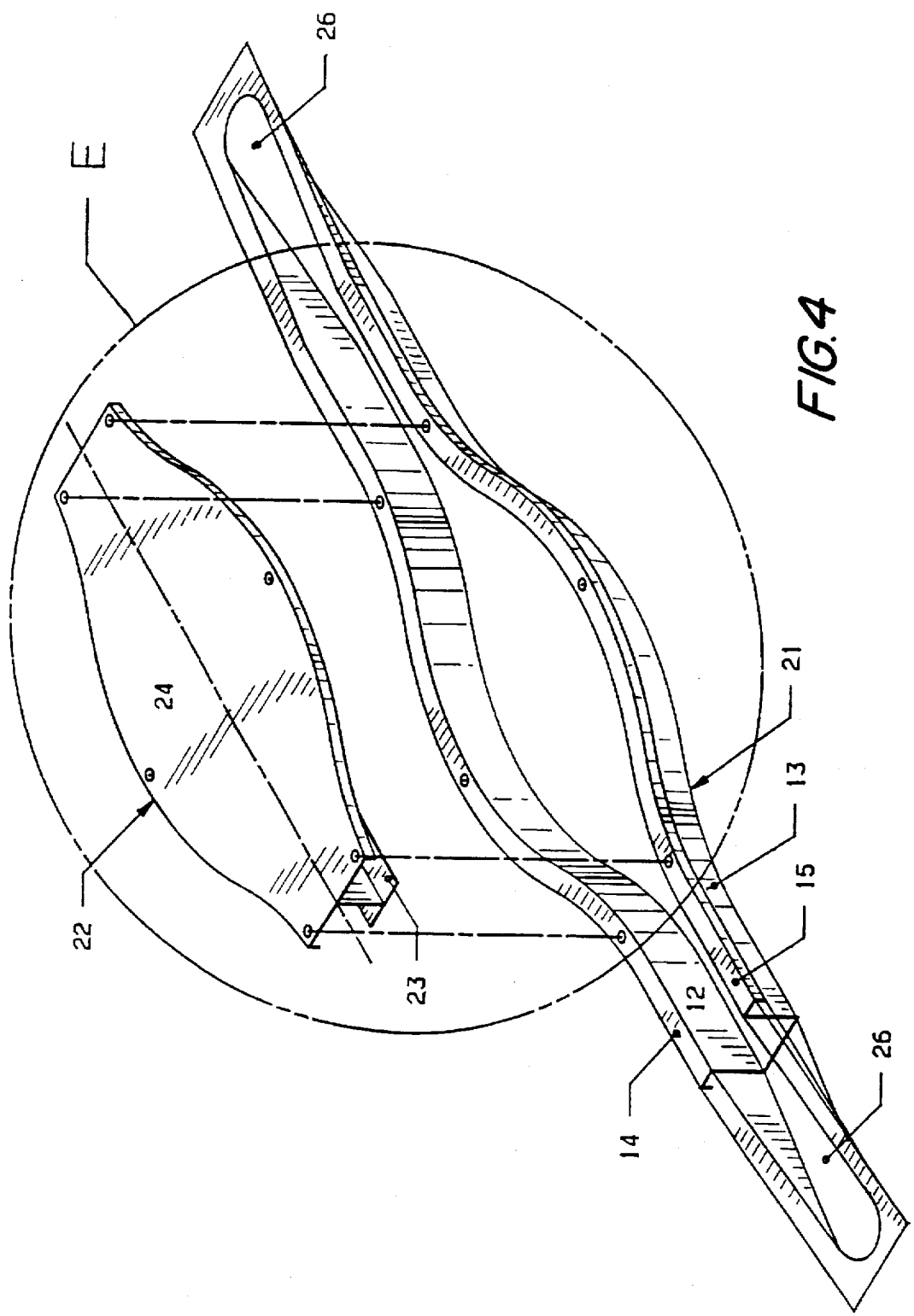
FIG. 4 is a view showing a second embodiment of the profiled rail with a reinforcement element having a T-shaped cross-section, in an exploded view.

A combination of a profiled rail 10 in accordance with FIG. 1 with a separate reinforcing element formed with a ring 11 in FIG. 2 provides a first possible embodiment of the inventive bracket support. The profiled rail 10 has a U-shaped cross-section. The outer free edges of the parallel legs 12 and 13 are bent outwardly perpendicularly for forming edge webs 14 and 15.

In the shown embodiment the width of the profiled rail 10 is greater in the central region, which will be identified hereinbelow as the reinforcing part, than in the end regions 26. In other words, the distance between the parallel legs 12 and 13 expands in the reinforcing part D. The increased cross-section region is in this embodiment arcuate or concave shaped. The transition between the rectilinear end regions 26 in the arc shaped or convex region is continuous. The ring 11 which serves as an additional reinforcing element is formed so that, it can be inserted in a closing manner or form-transmitting manner in the central region. During the force-transmitting connection, the webs 14 and 15 are elastically deformed so as to form flanges, and the ring 11 is held by the restoring forces. The cross-section of the ring 11 can have different types. Only some advantageous possibilities are shown in FIGS. 6–15.

In contrast to the embodiment shown in FIG. 1, the profiled rail 10 can also have a C-shaped cross-section. The outer edge webs engage the associated edge of the ring 11 from outside inwardly. With such an embodiment the ring 11 is fixed in a form-locking manner. An example of this type of mounting is schematically shown in FIG. 2a.

In the embodiment shown in FIGS. 1, 2 the central region of the impact bracket which is limited by the dash-dot limiting line D, or in other words the reinforcing part, is formed so that it increases both in a cross-section expansion and also combined with an additional reinforcing element 11. It is to be understood that it is also possible to omit the additional reinforcing element 11 so that the reinforcing part D has an increased resistance moment alone, for example by the cross-section increase of the profiled rail in the central region as shown in FIGS. 1, 4, 4a, 5, 16–20 and 25. The invention can also include a further variant, with which in the central reinforcing part D an increased resistance moment can be obtained, and particularly independently from an additional reinforcing element or the profiled rail in its central region can be provided with a cross-section expansion in form of an arcuate bulging. In such a case it is for example possible to provide the central reinforcing part D of the profiled rail 10, 21 with different cross-section dimensions or wall thicknesses over its length and/or width, and/or height. This can be obtained in form of material thickening, the selection of suitable material and the like.

Figure 4A:
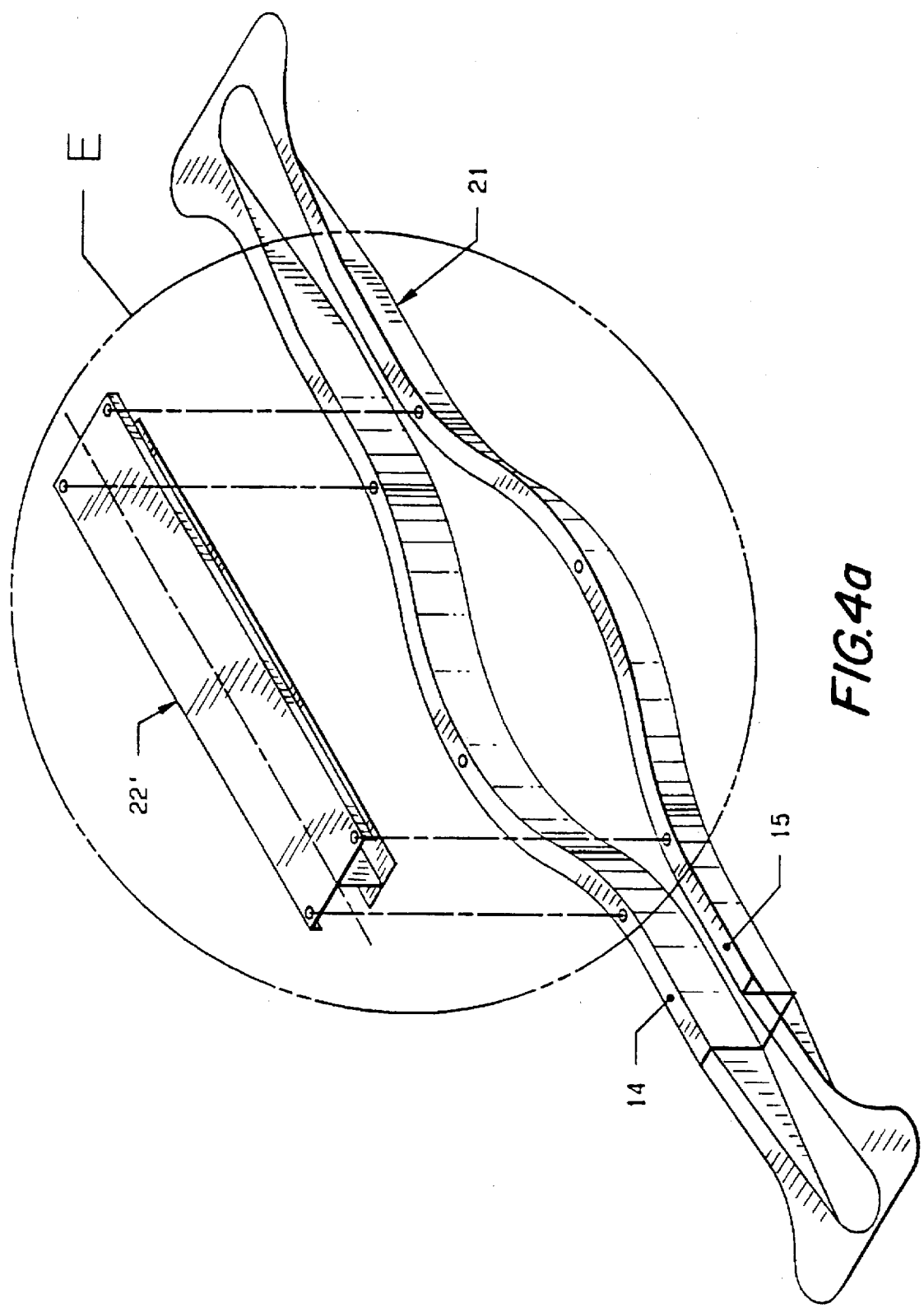
FIGS. 4a and 4b are views of the profiled rail of FIG. 4, however, with a different cross-sectional shapes of the reinforcing element.
Figure 4B:
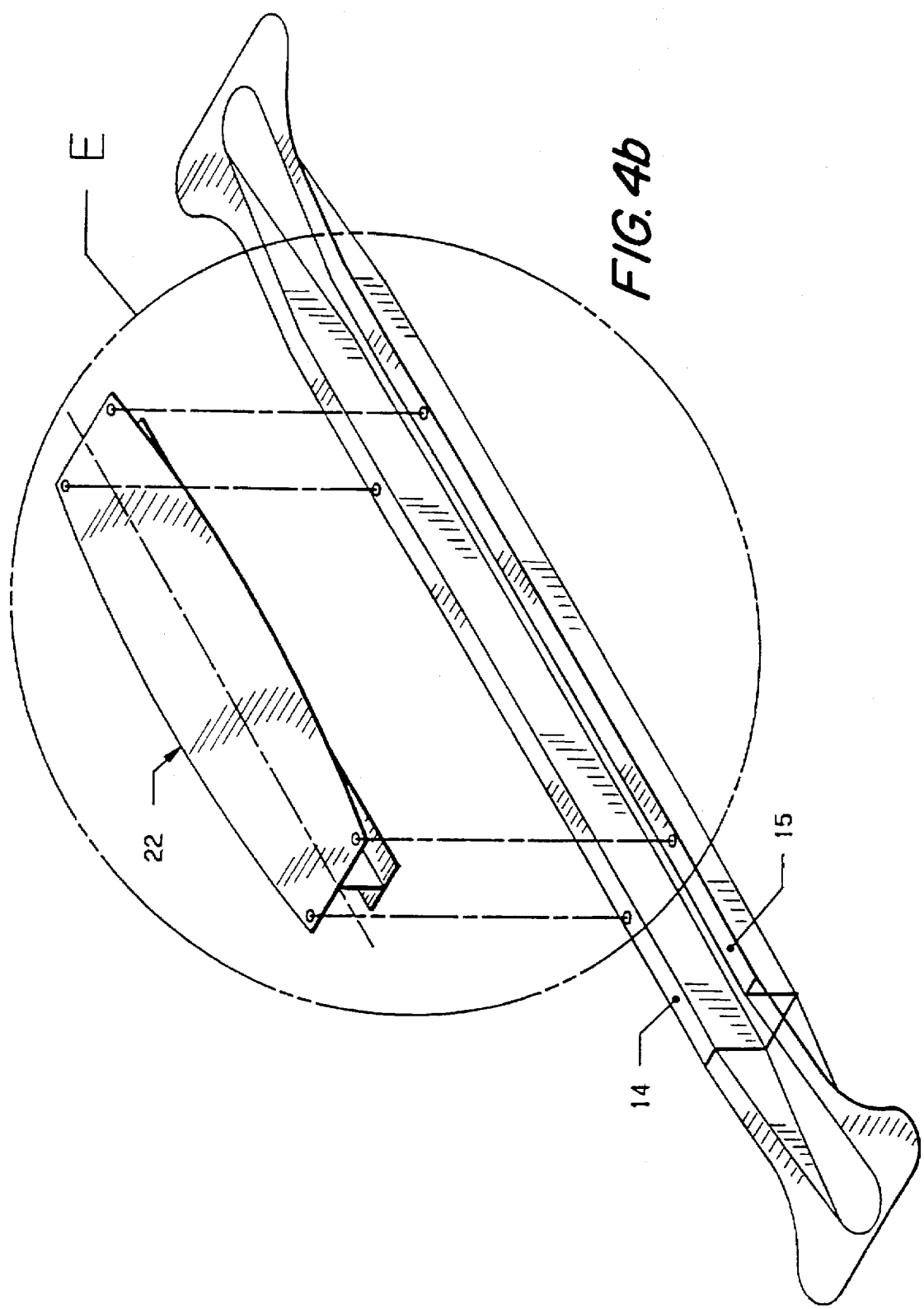
Figure 21:
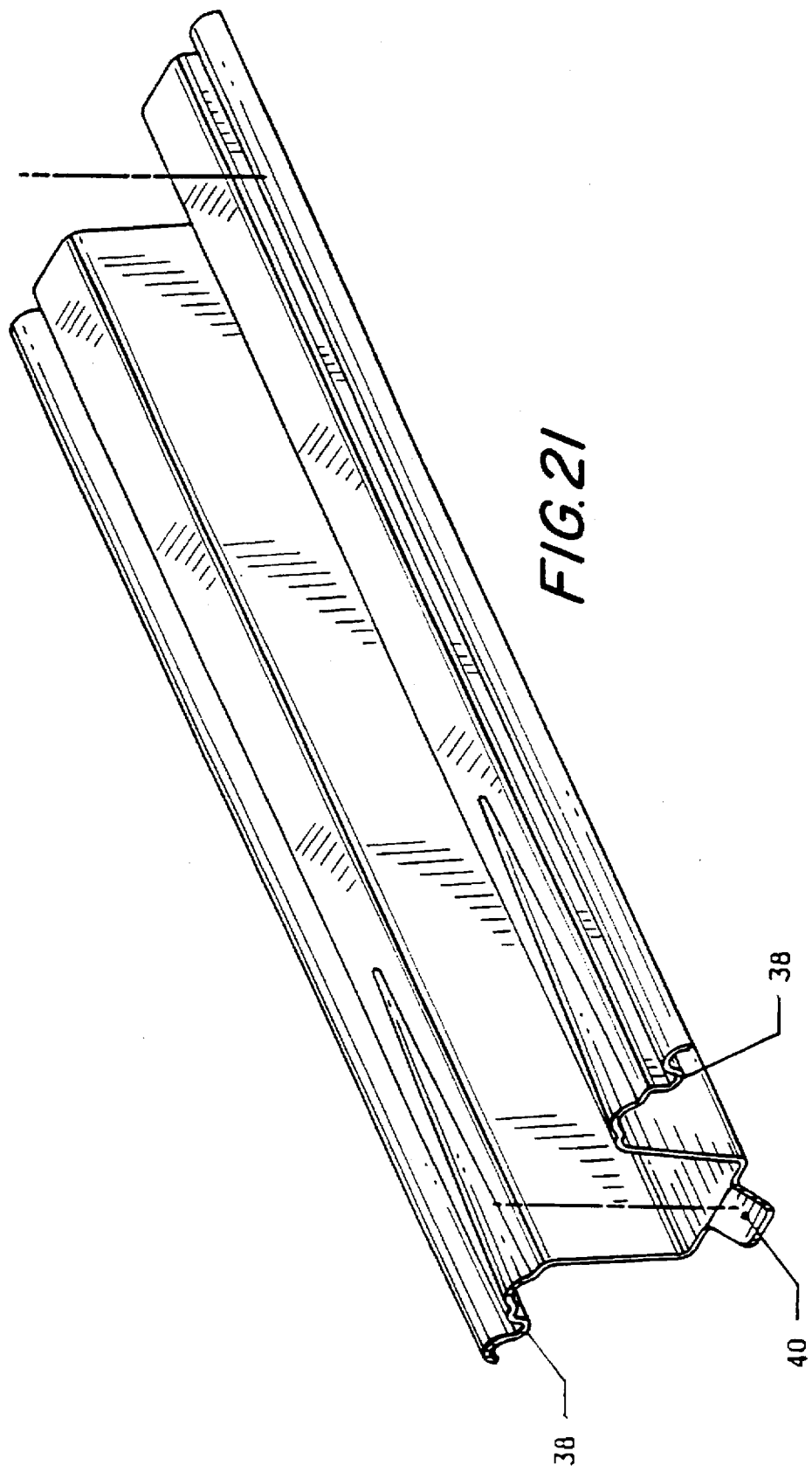
FIG. 21 is a view showing a part of a profiled rail with groove-shaped outer edges and a reinforcing groove in a lower transverse web of the profiled rail.

In accordance with the above-described possibilities it is also recommended to form the profiled rail so that it is continuously rectilinear in the center as shown in FIGS. 4b and 21. In FIG. 4b the reinforcing part is formed mainly by the separate reinforcing element 22. The central profiled rail region together with reinforcing element 22 are recognized by the dash-dot limiting line E. In FIG. 21, for cross-section reinforcement in the side legs and the upper angled portions as well as in the lower transverse runs of the profiled rail, corrugations 38 or steps arctional bulges or steps are provided. They can be completed by an additional reinforcing element which is not shown in the drawings. In FIGS. 22–24 the reinforcing part is first of all composed of a profiled rail 10 which in the central region is increased from outside inwardly in its cross-section, and additionally flanged on its side angled portions with a rectilinearly extending plate or flat rail 40, 41. Here also the complete reinforcing part (profiled rail and reinforcing element) can be recognized by the dash-dot limiting E shown in FIG. 2. It can be seen therefore that the reinforcing part is formed both by the flanged plate or flat rail 40, 41 and also additionally from the cross-section increase of the profiled rail in the central region.

Figure 25:
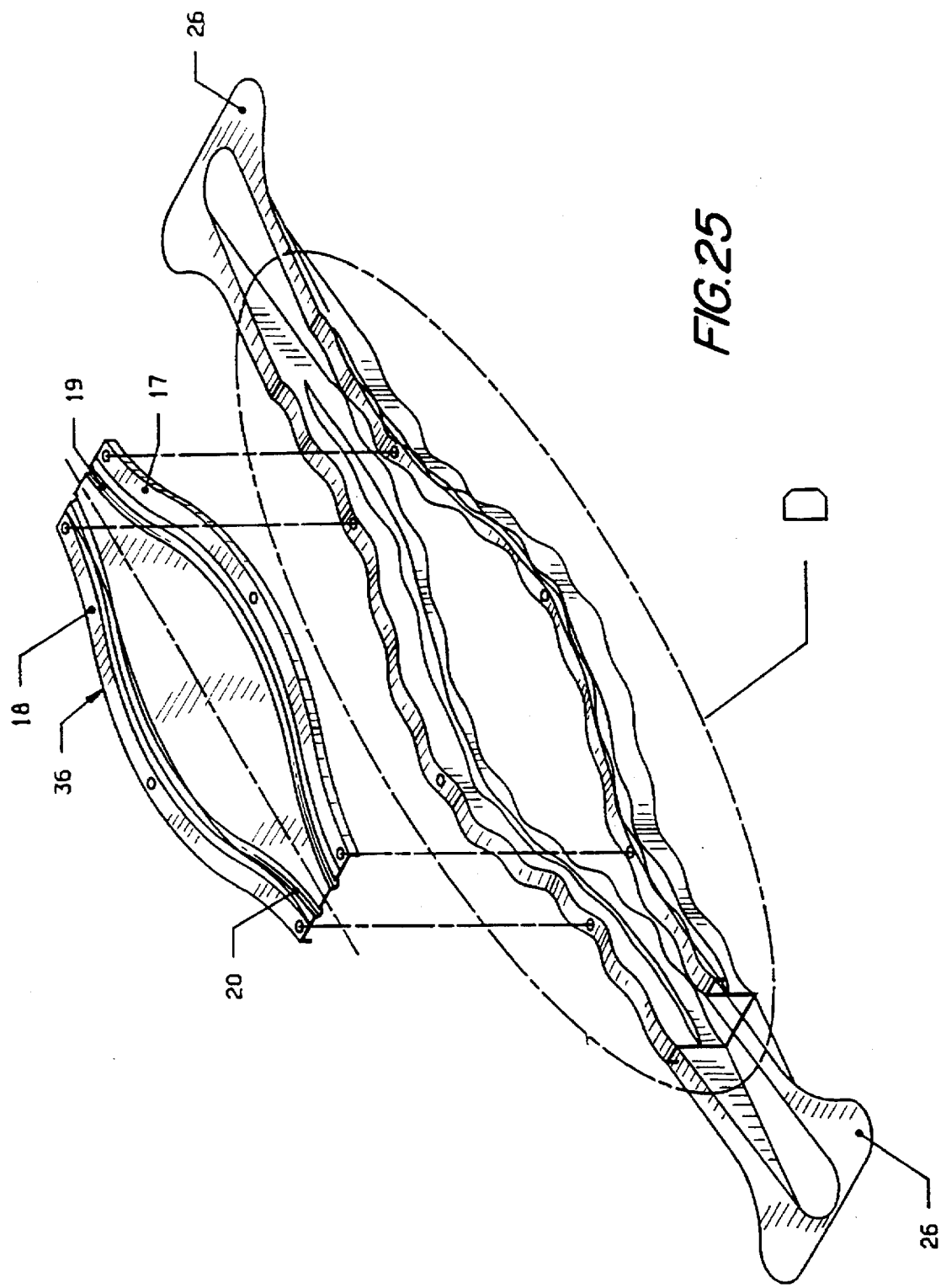
FIG. 25 is a perspective view of the profiled rail with wave-shaped side legs over its length.

Another very important variant in accordance with the present invention to increase the resistance moment inside the profile is shown in FIG. 25. It can be seen that the profiled rail has a wave-shaped course over its length. In other words, the distance $b_4$, as shown in FIG. 16a between the side legs 12 and 13 of the profiled rail can alternatingly increase and decrease. This wave-shaped contour can extend over the whole length of the profiled rail or over the length of the reinforcing part D in the central region of the profiled rail only. It can be desirable when the wave-shaped or other reinforcing ribs extend from upper side edges of the side flanges 12 and 13 downwardly or in other words reduce toward the bottom of the profiled rail.

Moreover an other reinforcing approach can be carried out, in accordance with which the lower transverse web of the profiled rail which connects the legs 14 and 15 is curved. In other words this web is drawn inwardly at least inside the central reinforcing part. Such curvatures are mainly provided in the region of the central reinforcing part of the profiled rail 10, so that as shown in FIGS. 16–19, island-like reinforcing zones are produced. For saving the material, these islands 30, 31, 32, 33 can be provided with recesses or depressions 33' and also formed of several parts.

In the C-shaped profiled rail of FIG. 2a, the legs 12 and 13 can be inclined in the cross-section toward one another and preferably so that the distance to the free edges reduces. Because of the ring 11 inserted in the profiled rail 10, the legs 12 and 13 which form the side walls of the profiled rail 10 are stabilized since the ring 11 acts for reinforcing the wall thickness. Preferably the ring is located with an associated end surface flush or in alignment with the edge webs 14 and 15. Depending on the cross-section of the profiled rail 10, the ring can be cylindrical or frustoconical.

Figure 5:
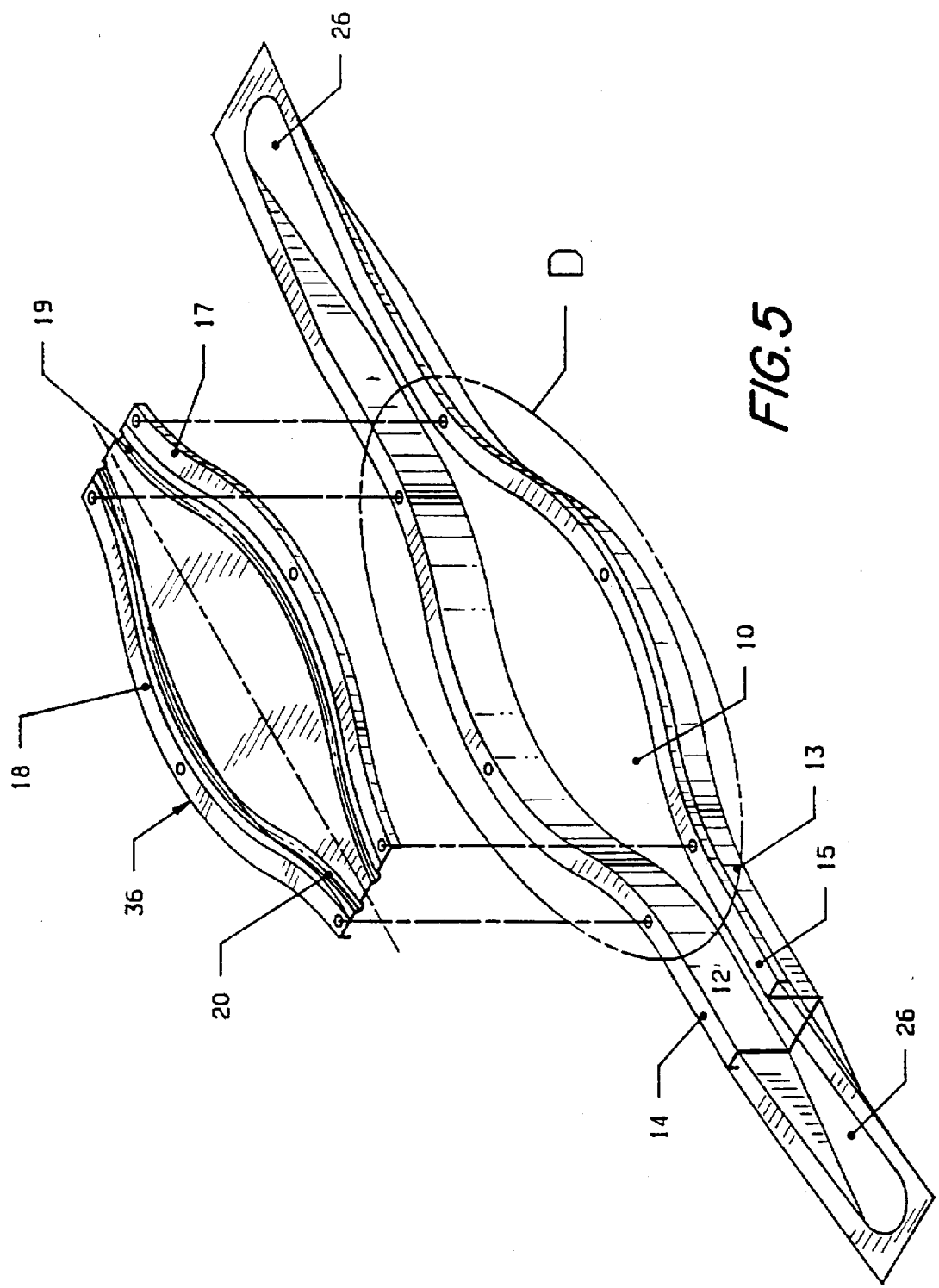
FIG. 5 is a view showing a profiled rail with a different reinforcing element in an explosion view.
Figure 17:
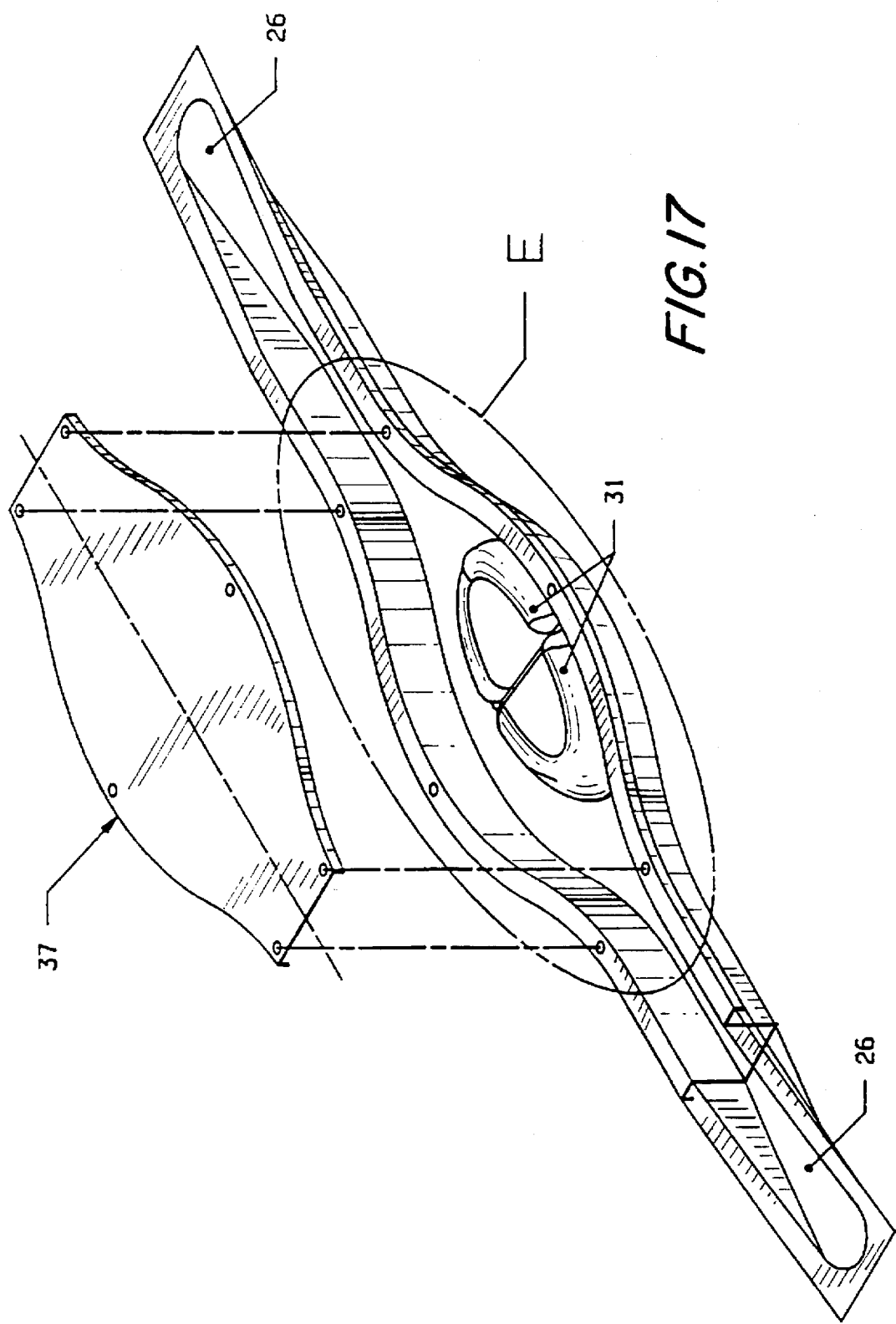
FIGS. 17, 18, 19 are views showing further embodiments and cross-section designs of the reinforcing islands.
Figure 18:
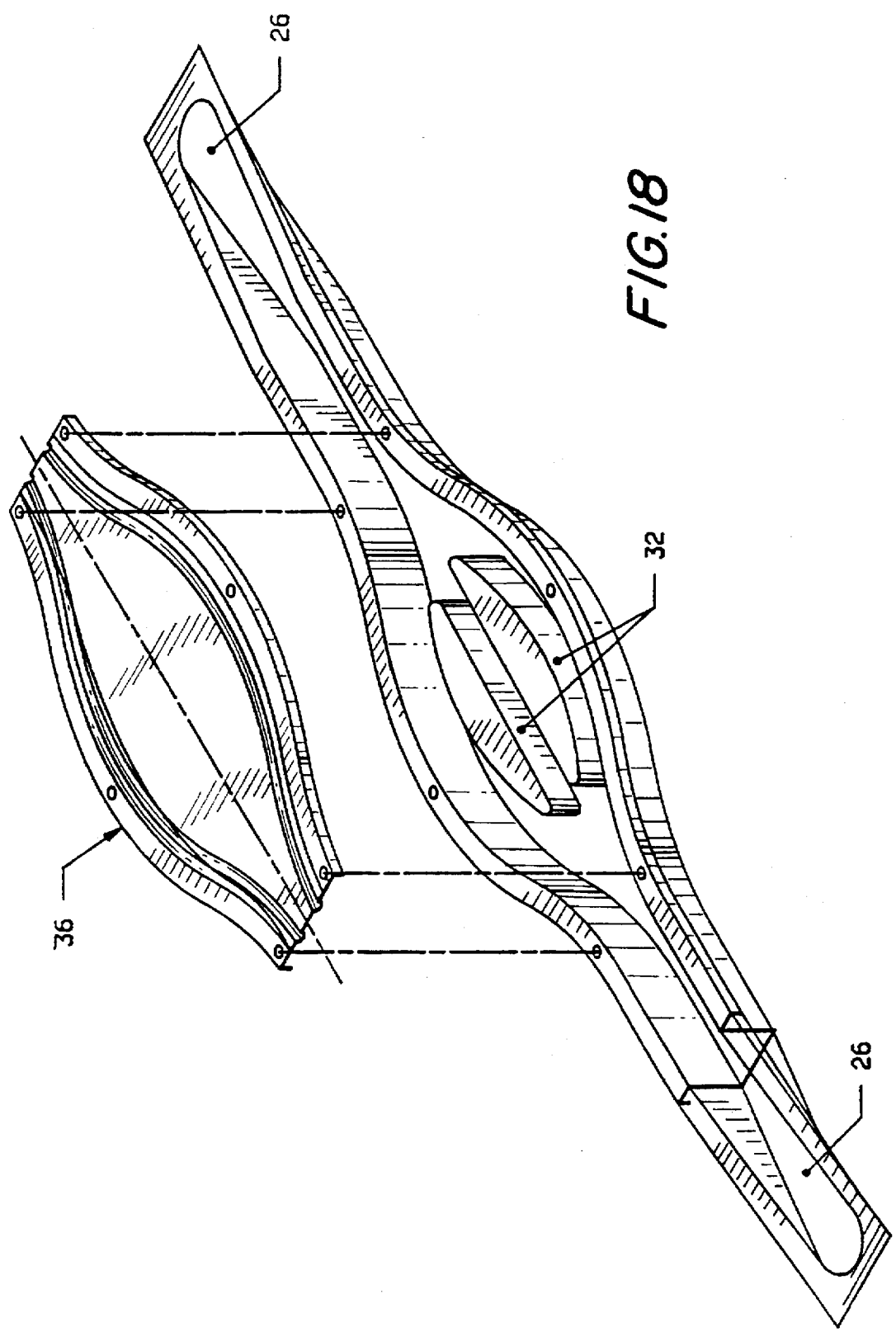
Figure 19:
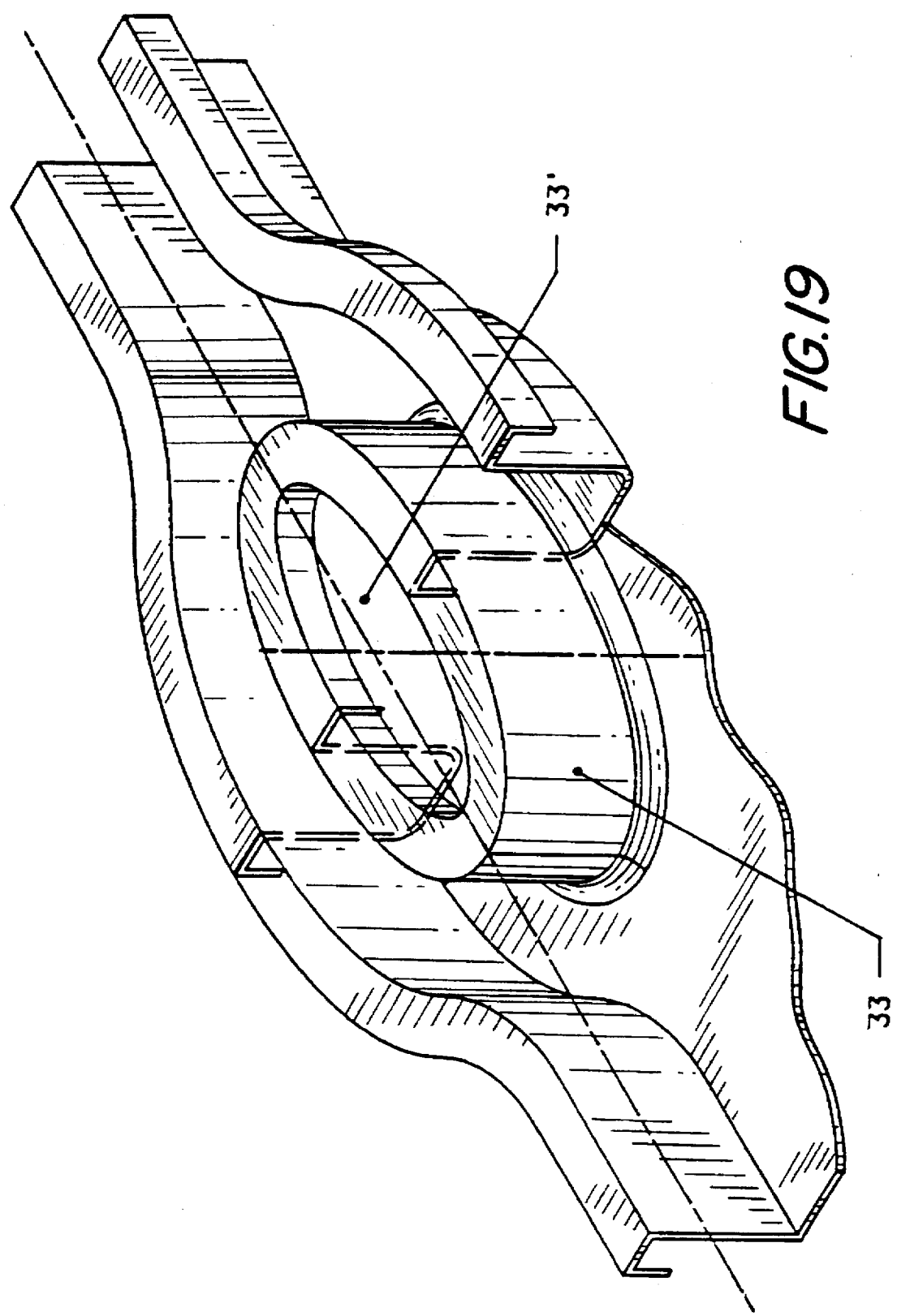
Figure 20:
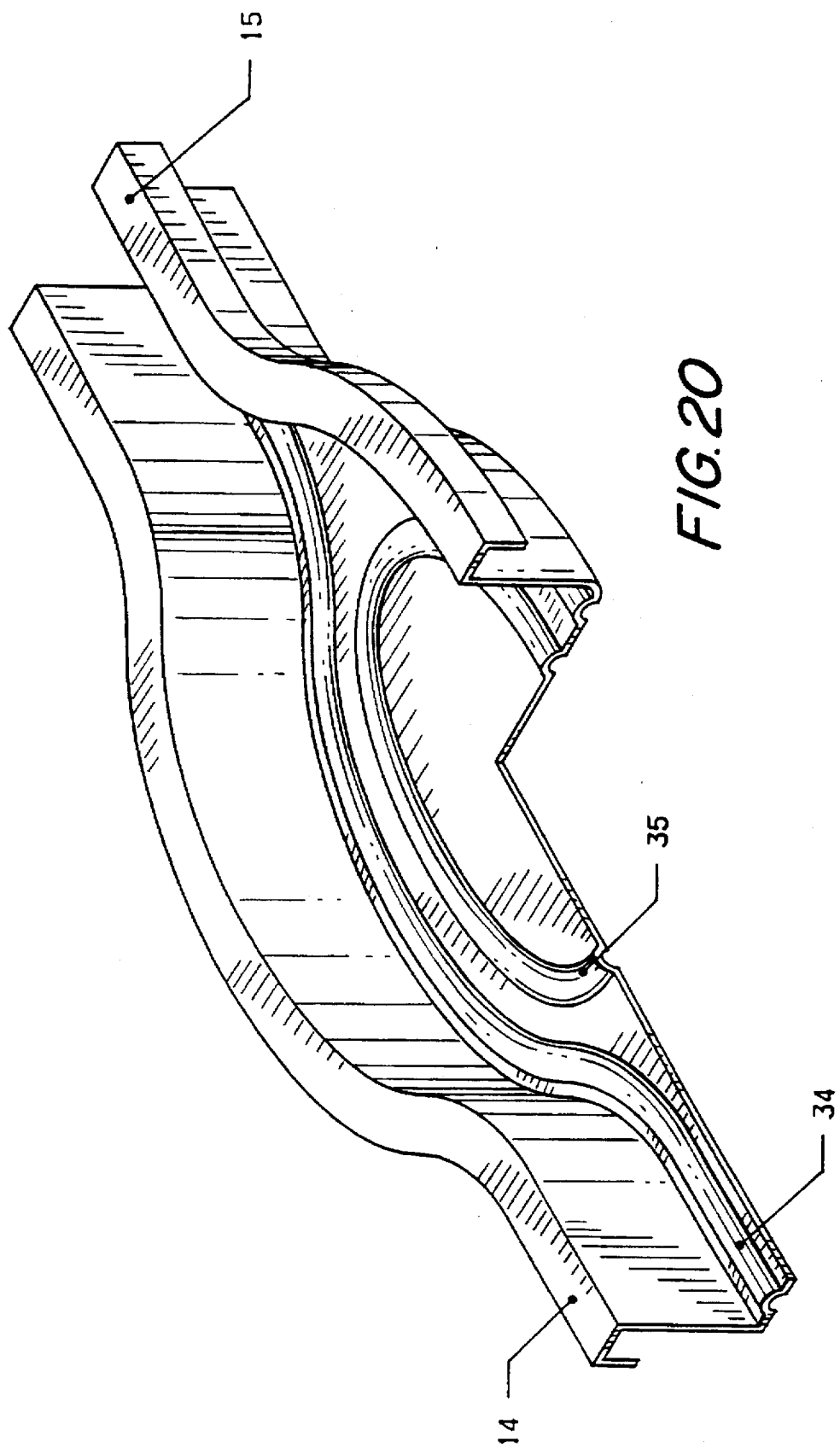
FIG. 20 is a view showing a profiled rail in a partial section with reinforcing corrugations inside and outside of the expanded central reinforcing part.

In FIGS. 3 and 5, the reinforcement element is formed as a replacement part 16 and 36 respectively, which is designed for the profiled rail shape of FIG. 1. The outer contour of the insertion parts 16, 36 correspond to the convexly curved central region of the profiled rail 10 so that it can be inserted in a closing way or in a force-transmitting way in the profiled rail 10. The replacement parts 16, 36 are provided with outer legs 17, 18 which engage the edge webs 14, 15 of the profiled rail 10 in the associated region. The outer legs can be connected with the edge webs 14, 15 by mechanical connecting means for example screws, rivets and the like, and also by glueing, welding or other procedures. For additional increase of the stability the respective insertion parts 16, 36 identified also as replacement parts in the examples of FIGS. 3, 4, 4a, 4b, 5, 16, 17, 18, 22–24 and 25 can be provided with corrugations 19, 20 which follow the outer contour. Corresponding corrugations can be also provided in the bottom region of the profiled rail as shown in FIG. 20. The corrugations there are identified by reference numerals 34, 35. The corrugations 35 can be formed as ring-shaped or over-shaped grooves. The grooves 34 can extend over the length of the profiled rail 10 or engage only a partial length of the profiled rail. Instead or in addition to the corrugations 34, 35, the bottom region of the profiled rail can be also provided with further material steps 40 shown in FIG. 21. They are also used for increase of the resistance moment in the reinforcement part and also when desired contributes to the conventional profile length.

In the embodiment of FIG. 4 the impact bracket is formed by an injection molded or rolled profiled rail 21 and a reinforcing element formed as a double-T-profiled piece 22. The widths of the parallel legs are unequal so that the smaller flange 23 engages in the profiled rail 21 and the outer edges of the wider flange 24 engage the edge webs 14, 15. They are connected with one another in the above described manner. The parallel legs 12, 13 which form the side walls are loaded since the force flux in the loading case is transferred from the wider leg 24 of the double-T-profiled piece through the center web to the smaller leg 23, and from there is transferred to the lower run of the profiled rail 21.

The embodiment of FIG. 4a differs from the embodiment of FIG. 4 in that the upper web of the double-T-profiled piece 22' is rectilinear or in other words in its outer contour it must not follow the outer contour of the legs 14, 15 of the profiled rail 21. In the third variant shown in FIG. 4b, the separately deformed reinforcing element 22, similarly to FIG. 4, is placed on a rectilinearly extending profile shape with a U-shaped cross-section, while in the examples of FIGS. 4 and 4a in the central reinforcing region the profiled rails are expanded in their central cross-sectional regions. The reinforcing part as a whole (profiled rail 21 and the reinforcing part 22') is in this embodiment identified by the dash-dot limiting line E. All shown and described embodiments can clearly illustrate that independently from the given exact contour of the profiled rails and/or reinforcing elements, in the central reinforcing region first of all it is provided that in the reinforcing region over a predetermined length of a reinforcing part D (only in the profiled rail) or E (profiled rail and reinforcing element) there is such a form, that with respect to the base form of the profiled rail at least in the central region increased resistance moment against bending is obtained.

In all embodiments shown in the drawings, the ends 27 of the profiled rails 10, 21, are flattened for reliably mount it to an automobile door. The same is also true with respect to FIGS. 5 and 16–18. If the impact bracket is used for other purposes then correspondingly the ends 26 can be adjusted.

FIGS. 6–15 show different shapes of the cross-section of the reinforcing element in form of a ring 11 of FIG. 2. The cross-section of FIGS. 6, 10 is angular, the cross-section of FIGS. 7, 9, 12 is a hollow profile, while the cross-section of FIGS. 11, 15 is shell-shaped or has the shape of a spherical ball portion. The cross-section in FIG. 14 is double-T-shaped, in FIG. 18 it is U-shaped, and in FIG. 13 it is box-shaped. It is understood that other shapes of the cross-section for a reinforcing element can be used as well.

The profiled rails 10, 21 shown in the drawings are open in the illustrated embodiments always at one side. It can be seen from the drawings that in all embodiments at least the resistance moment against bending at the central region is considerably higher than in the end regions. In the case of loading the ratio between the different stresses over the length of the impact bracket is substantially smaller than in impact brackets which over their whole lengths have an identical cross-section without the features proposed in accordance with the present invention.

In FIG. 16a a profiled cross-section is continuously dimensioned. The dimensions $b_1$ to $b_4$ as well as the height of the legs or angled portions $h_1$, $h_2$ are changeable. When the dimension $b_1$ is smaller than $b_4$, a substantially V-shaped profiled cross-section is obtained as shown in FIG. 16b. When the dimension $b_1$ is greater than the dimension $b_4$, a substantially C-shaped cross-section is obtained as shown in FIG. 2a. The dimensions $b_2$ form the total width of the cross-section with consideration of the angled portions 14, 15. The dimension $b_3$ characterizes the width of an angled portion 14, 15. While not shown in the drawings, it is recommended to round the corners of the cross-sections.

It will be understood that each of the elements described above, or two or more together, may also find a useful application in other types of constructions differing from the types described above.

While the invention has been illustrated and described as embodied in an impact bracket, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An impact bracket for a side wall of a vehicle, comprising at least one trough-shaped profiled rail which is open along its length and has a central region and end regions, said central region having an increased cross-section relative to cross-sections of said end regions so as to form in said central region a reinforcing part which increases a resistance moment against bending, said cross-section of said central region being arcuately shaped in a longitudinal direction and a continuous transition in the longitudinal direction is provided between said cross-section of said central region and said cross-sections of said end regions.

2. An impact bracket as defined in claim 1, wherein said reinforcing part is formed as an increased cross-section of said profiled rail.

3. An impact bracket as defined in claim 1, wherein said reinforcing part is formed as an additional reinforcing element arranged in said central region of said profiled rail and having said increased cross-section.

4. An impact bracket as defined in claim 2, wherein said central reinforcing part has different cross-section sizes in at least one of its length, its width and its height.

5. An impact bracket as defined in claim 3, wherein said additional reinforcing element has said increased cross-section in a direction of at least one of its length, its width and its height.

6. An impact bracket as defined in claim 3, wherein said profiled rail and said reinforcing element are composed of materials having different strengths.

7. An impact bracket as defined in claim 1, wherein said profiled rail has a substantially U-shaped cross-section with side legs, said side legs having outer edges which form upper edge webs and are bent outwardly.

8. An impact bracket as defined in claim 7, wherein said outer edges are bent outwardly many times.

9. An impact bracket as defined in claim 7, wherein said profiled rail has a lower transverse web with a width which increases from ends of said lower transverse web to a center, said edge webs of both said side legs have a height and a width which increase toward the center; and further comprising an additional reinforcing element arranged on said central region of said profiled rail.

10. An impact bracket as defined in claim 7, wherein said edge webs are bent outwardly substantially perpendicularly.

11. An impact bracket as defined in claim 7, wherein said legs are arranged at an angle which changes along a length of said profiled rail.

12. An impact bracket as defined in claim 7, wherein said profiled rail has a lower transverse web, a width of said lower transverse web and a distance between said side legs in an upper region changing from said end regions of said profiled rail toward a center independently from one another.

13. An impact bracket as defined in claim 7, wherein said profiled rail has a lower transverse web, said side legs being spaced from one another by a distance which at least over a part of a length of said profiled rail is selectively increased or reduced.

14. An impact bracket as defined in claim 7, wherein said profiled rail has a lower transverse web, said side legs being spaced from one another by a distance which at least over a part of a length of said profiled rail extends to a center of a cross-section of said profiled rail and to said lower transverse web of said profiled rail.

15. An impact bracket as defined in claim 7, wherein said profiled rail has a lower transverse web with a width which changes over at least a partial length of said profiled rail toward a center of said profiled rail.

16. An impact bracket as defined in claim 1 wherein said reinforcing part has a bottom provided with at least one reinforcing island.

17. An impact bracket as defined in claim 16, wherein said reinforcing islands are integrated in a material of said profiled rail.

18. An impact bracket as defined in claim 16, wherein said reinforcing islands are formed as separate material reinforcing elements.

19. An impact bracket as defined in claim 18, wherein said separate material reinforcing elements which form said reinforcing islands are connected with said bottom of said reinforcing part.

20. An impact bracket as defined in claim 16, wherein said reinforcing islands are provided with recesses.

21. An impact bracket as defined in claim 3, wherein said reinforcing element is formed as a replacement part and has outer legs, said profiled rail has edge webs which at least partially are overlapped by said outer legs of said replacement part; and further comprising means for connecting said edge webs and said outer legs with one another.

22. An impact bracket as defined in claim 21, wherein said replacement part is provided with a plurality of corrugations.

23. An impact bracket as defined in claim 22, wherein said corrugations are formed so that they follow an outer contour of said replacement part.

24. An impact bracket as defined in claim 21, wherein said replacement part has walls which correspond to a contour of said profiled rail.

25. An impact bracket as defined in claim 3, wherein said reinforcing element is formed as a ring having free angled edges, said profiled rail having a C-shaped cross-section and engaging said edges of said ring.

26. An impact bracket as defined in claim 3, wherein said reinforcing element is formed as a double-T-shaped profiled member with parallel flanges having unequal widths.

27. An impact bracket as defined in claim 3, wherein said reinforcing element is formed as a double-T-shaped profiled member with parallel flanges having a constant width.

28. An impact bracket as defined in claim 1, wherein said profiled rail has a lower transverse web which over at least a part of a length of said profiled element is provided with at least one bulge.

29. An impact bracket for a side wall of a vehicle, comprising at least one trough-shaped profiled rail which is open along its length and has a central region and end regions, said central region having an increased cross-section relative to cross-sections of said end regions so as to form in said central region a reinforcing part which increases a resistance moment against bending, said reinforcing part being formed as a ring which is closingly inserted in said central region of said profiled rail.

30. An impact bracket as defined in claim 29, wherein said ring has a cross-section selected from the group consisting of an angular cross-section, a C-shaped cross-section, a U-shaped cross-section, a double-T-profile-shaped cross-section, a hollow profile cross-section or a solid profile cross-section.

\* \* \* \* \*